United States Patent
Cernasov et al.

(10) Patent No.: US 8,063,798 B2
(45) Date of Patent: Nov. 22, 2011

(54) METHODS AND APPARATUS TO ASSIST PILOTS UNDER CONDITIONS IN WHICH SPATIAL DISORIENTATION MAY BE PRESENT

(75) Inventors: Andrei Cernasov, Ringwood, NJ (US); Robert Mead, Flemington, NJ (US); Fernando de la Vega, Ridgefield Park, NJ (US)

(73) Assignee: Honeywell International Inc., Morristown, NJ (US)

( * ) Notice: Subject to any disclaimer, the term of this patent is extended or adjusted under 35 U.S.C. 154(b) by 330 days.

(21) Appl. No.: 12/132,489

(22) Filed: Jun. 3, 2008

(65) Prior Publication Data

US 2009/0295602 A1 Dec. 3, 2009

(51) Int. Cl.
*G01C 23/00* (2006.01)
(52) U.S. Cl. ........ 340/980; 340/963; 340/974; 340/975; 340/967; 345/8; 345/9
(58) Field of Classification Search .......... 340/945–980; 701/4, 14; 345/7–9; 382/190, 276
See application file for complete search history.

(56) References Cited

U.S. PATENT DOCUMENTS

| 5,296,854 | A   | * | 3/1994  | Hamilton et al. | 340/980    |
|-----------|-----|---|---------|-----------------|------------|
| 7,106,217 | B2  | * | 9/2006  | Judge et al.    | 340/973    |
| 7,312,766 | B1  | * | 12/2007 | Edwards         | 345/8      |
| 7,418,318 | B2  | * | 8/2008  | Hrabak et al.   | 701/3      |
| 2001/0010225 | A1 | * | 8/2001  | Keller        | 128/201.25 |
| 2004/0225236 | A1 | * | 11/2004 | Wheeler et al. | 600/595   |
| 2006/0087452 | A1 | * | 4/2006  | Scherbarth    | 340/974    |
| 2006/0253001 | A1 | * | 11/2006 | Small et al.   | 600/300    |
| 2007/0085705 | A1 | * | 4/2007  | He et al.      | 340/967    |

* cited by examiner

*Primary Examiner* — Brent Swarthout
(74) *Attorney, Agent, or Firm* — Ingrassia Fisher & Lorenz, P.C.

(57) ABSTRACT

Embodiments include systems and methods for assisting a pilot of an aircraft. The system includes a near-eye display and a processing subsystem. The near-eye display includes a transparent display panel that is adapted to be oriented in proximity to at least one eye of the pilot. The processing subsystem is adapted to receive aircraft data that indicates an attitude of the aircraft, and to determine whether the aircraft data indicates a potential spatial disorientation situation. When the aircraft data indicates the potential spatial disorientation situation, the processing system is adapted to cause the near-eye display to display an exterior display indicator overlying at least a portion of the windshield of the aircraft. The exterior display indicator includes a visual representation of an earth-based reference, and the exterior display indicator is oriented to indicate the attitude of the aircraft.

24 Claims, 4 Drawing Sheets

METHODS AND APPARATUS TO ASSIST PILOTS UNDER CONDITIONS IN WHICH SPATIAL DISORIENTATION MAY BE PRESENT

TECHNICAL FIELD

The embodiments generally relate to methods and systems for assisting a pilot of an airplane under conditions in which spatial disorientation may be present.

BACKGROUND

The most accurate information available to a pilot about an aircraft's position, motion, and attitude are exterior visual cues (e.g., the Earth's horizon) and the aircraft's flight instruments. When exterior visual cues are unavailable, such as when the horizon is not visible, a pilot should rely on the aircraft's flight instruments. However, when the pilot's attention is distracted from the attitude or altitude instruments or the pilot has limited instrument flight time, the pilot may instead rely on sensory information provided by the pilot's vestibular system (e.g., organs of equilibrium located in the inner ear) and/or proprioceptive system (e.g., receptors located in the skin, muscles, tendons, and joints).

Under certain circumstances, an aircraft pilot may experience spatial disorientation, which refers to a condition when a pilot's sense of the aircraft's attitude or rotation is incorrect and is based on misinterpreted sensory information. For example, when a pilot initiates a banking right turn, the pilot's inner ear may detect the roll into the turn. However, if the turn is held constant, the pilot's inner ear quickly may compensate, and the pilot inaccurately may sense that the aircraft has returned to level flight. Accordingly, when the pilot subsequently levels the wings, the pilot may perceive that the aircraft is banking to the left. In the absence of exterior visual references to counteract the sensation, the pilot may rely on the sensory illusion produced by the inner ear, and spatial disorientation may result.

It is extremely dangerous for a pilot to fly under a sustained condition of spatial disorientation, particularly if the pilot is not adequately trained to rely on the aircraft instruments, because the condition may cause the pilot to enter an unsafe maneuver and/or to lose control of the aircraft. Several dangerous illusions that may occur as a pilot is experiencing spatial disorientation include the "graveyard spin," the "graveyard spiral," and the "Coriolis illusion." Any one of these illusions, if not recognized and compensated for in adequate time, may result in an excessive loss of altitude and an impact with terrain.

Although non instrument-rated pilots are prohibited from flying under limited visibility conditions in which spatial disorientation is likely, significant numbers of general aviation accidents that are attributable to spatial orientation continue to occur. Accordingly, it is desirable to provide methods and apparatus for assisting pilots under conditions in which spatial disorientation is likely to be present. Other desirable features and characteristics of the embodiments will become apparent from the subsequent detailed description of the inventive subject matter and the appended claims, taken in conjunction with the accompanying drawings and this background of the inventive subject matter.

BRIEF SUMMARY

An embodiment includes a system for assisting a pilot of an aircraft. The system includes a near-eye display and a processing subsystem. The near-eye display has a transparent display panel, and the transparent display panel is adapted to be oriented in proximity to at least one eye of the pilot. The processing subsystem is adapted to receive aircraft data that indicates an attitude of the aircraft, and to determine whether the aircraft data indicates a potential spatial disorientation situation. When the aircraft data indicates the potential spatial disorientation situation, the processing system is adapted to cause the near-eye display to display an exterior display indicator overlying at least a portion of the windshield of the aircraft, where the exterior display indicator includes a visual representation of an earth-based reference, and the exterior display indicator is oriented to indicate the attitude of the aircraft.

Another embodiment of a system for assisting a pilot of an aircraft includes a near-eye display, a head position sensing system, and a processing subsystem. The near-eye display has a transparent display panel, and the transparent display panel is adapted to be oriented in proximity to at least one eye of the pilot. The head position sensing system is adapted to generate head position data representing a head position and a head orientation of the pilot. The processing subsystem is communicatively coupled to the near-eye display and the head position sensing system, and is adapted to receive aircraft data that indicates an attitude of the aircraft, and to determine whether conditions indicated by the aircraft data or the head position data indicate a potential spatial disorientation situation. When the conditions indicate the potential spatial disorientation situation, the processing subsystem is further adapted to cause the near-eye display to display an exterior display indicator overlying at least a portion of the windshield of the aircraft, where the exterior display indicator includes a visual representation of a static, earth-based reference, which is oriented to indicate the attitude of the aircraft.

Another embodiment includes a method for assisting a pilot of an aircraft, the method includes the steps of receiving aircraft data that indicates an attitude of the aircraft, determining whether the aircraft data indicates a potential spatial disorientation situation, and when the aircraft data indicates the potential spatial disorientation situation, causing a near-eye display to display an exterior display indicator on a transparent display panel to overly at least a portion of the windshield of the aircraft, where the exterior display indicator includes a visual representation of an earth-based reference, which is oriented to indicate the attitude of the aircraft.

BRIEF DESCRIPTION OF THE DRAWINGS

The embodiments will hereinafter be described in conjunction with the following drawing figures, wherein like numerals denote like elements.

DETAILED DESCRIPTION

The following detailed description is merely representative in nature and is not intended to limit the inventive subject matter or the application and uses of the inventive subject matter. Furthermore, there is no intention to be bound by any theory presented in the preceding background or the following detailed description.

Embodiments include methods and systems adapted to assist a pilot of an aircraft in its operation, particularly under conditions in which spatial disorientation may be present. Example embodiments described in detail below include systems and apparatus that are implemented in airplanes and airplane cockpits. These example embodiments are not intended to limit the scope of the inventive subject matter to systems that are implemented in airplanes. Instead, various alternate embodiments may be implemented in systems that include apparatus and/or vehicles other than airplanes. For example, but not by way of limitation, embodiments may be implemented in a simulator environment (e.g., a flight simulator), a helicopter, a gyroplane, a glider, and other airborne vehicles that include a cockpit (or control compartment) and a windshield or window through which exterior visual cues may be viewed.

Figure 1:
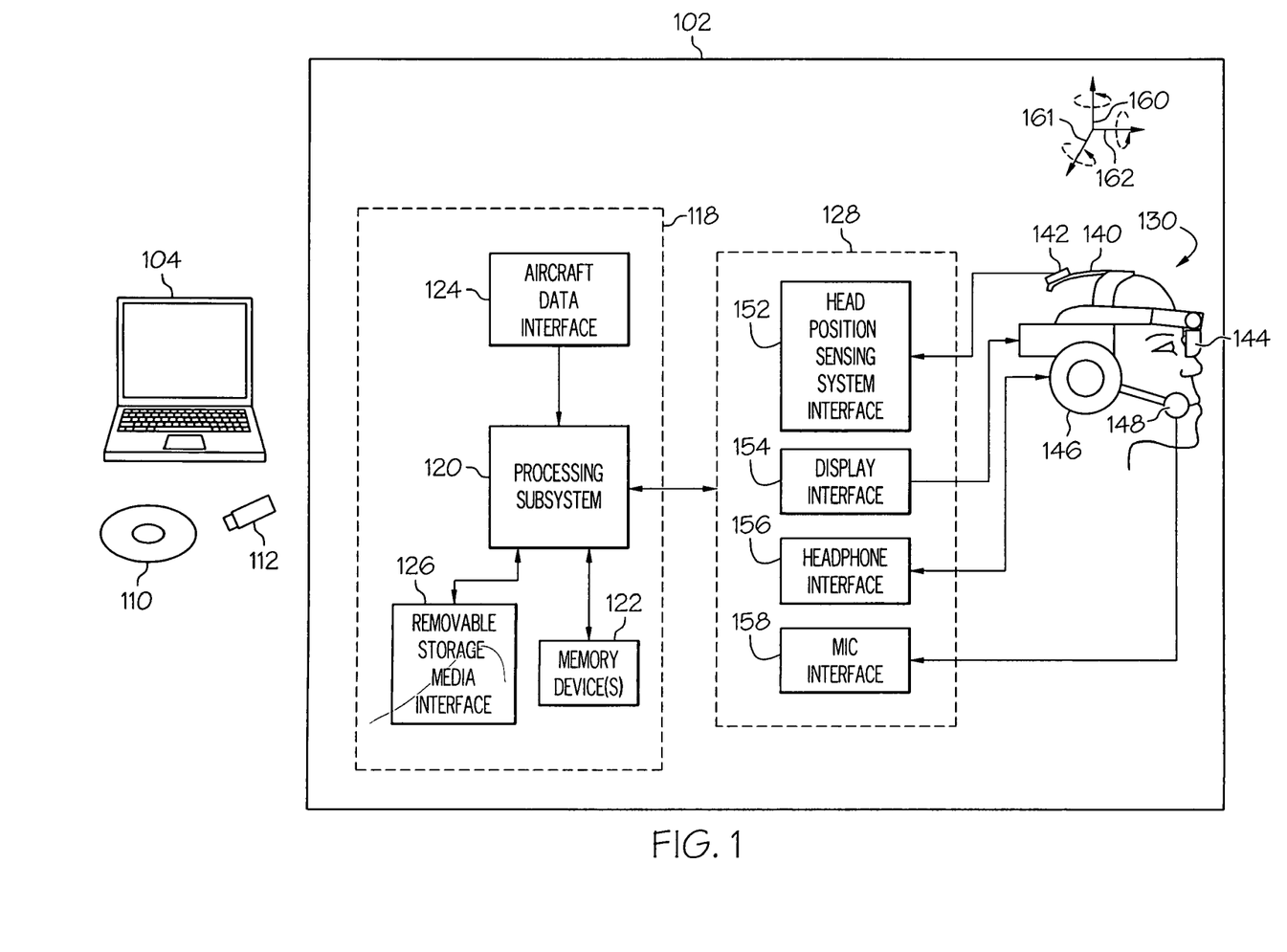
FIG. 1 is a simplified block diagram of an on-board pilot assistance system, according to an example embodiment.

FIG. 1 is a simplified block diagram of an on-board pilot assistance system 102, according to an example embodiment. On-board pilot assistance system 102 includes an on-board processing system 118, headgear interfaces 128, and headgear 130. The various components of on-board pilot assistance system 102 may be communicatively coupled as illustrated, in an embodiment, in order to exchange information between the various components. On-board processing system 118 includes, in an embodiment, a processing subsystem 120, one or more memory devices 122 (e.g., random access memory (RAM), read only memory (ROM), and/or other types of memory devices), aircraft data interface 124, and removable storage media interface 126. Processing subsystem 120 includes at least one general purpose or special purpose microprocessor, in an embodiment.

As will be explained in more detail below, processing subsystem 120 is adapted to receive aircraft data that indicates an attitude of the aircraft, and to determine whether conditions indicated by the aircraft data indicate a potential spatial disorientation situation. When the conditions indicate the potential spatial disorientation situation, processing subsystem 120 is further adapted to cause a near-eye display (e.g., near-eye display 144) to display an exterior display indicator overlying at least a portion of the aircraft's windshield, where the exterior display indicator includes a visual representation of an earth-based reference, and the exterior display indicator is oriented to indicate at least the attitude of the aircraft. As the flight continues, the processing subsystem is further adapted to receive additional aircraft data. When the additional aircraft data indicates a change in the attitude, heading and/or position (e.g., altitude, latitude, and/or longitude) of the aircraft, the processing subsystem 120 is adapted to cause the near-eye display to display an updated exterior display indicator to indicate the change in the attitude, heading, and/or position of the aircraft. In that way, the sequentially-displayed exterior display indicators may indicate, to the pilot, changes in aircraft attitude, heading, and/or position. Processing subsystem 120 also may be adapted to cause the near-eye display to display interior display indicators in proximity to cockpit instruments and/or control components, as will be described in more detail later.

As used herein, an "interior" display indicator refers to an indicator of a feature inside the cockpit, such as an instrument or a control component. In an embodiment, interior display indicators may be positioned on the display panel to overlie or indicate areas of a cockpit that include the aircraft's instruments (e.g., the altimeter, the attitude indicator, etc.) and control components (e.g., the yoke, the throttle, the rudder pedals, etc.). In contrast, an "exterior" display indicator refers to a feature or reference outside the cockpit. In an embodiment, exterior display indicators may be positioned on the display panel to overlie areas that correspond to the aircraft's windshield or other windows. Exterior display indicators and interior display indicators may be referred to collectively or generically herein as "display indicators." Display indicators may include one or more indicators selected from a group that includes, but is not limited to, a grid, a line (e.g., a horizon line) or a set of lines, a representation of featureless terrain, a topographical representation of terrain, a cockpit instrument indicator, a control component indicator, a symbol (e.g., an arrow, a building, a tree, a mountain), and a text message.

In order to perform the functions discussed above, processing subsystem 120 is adapted to execute a pilot assistance application program (e.g., a computer program) that includes computer-readable instructions for performing the functions. The pilot assistance application program may be stored in and accessed from a memory device 122 or a removable storage media (e.g., CD ROM 110 or USB port-compatible removable storage device 112) that is inserted into removable storage media interface 126 (e.g., a CD drive and/or USB port).

In an embodiment, upon a determination that a display indicator should be displayed (e.g., when a potential spatial disorientation situation is detected), processing subsystem 120 is adapted to determine a default location of a display indicator on the display panel based on aircraft specific layout information, which may be stored in memory device 122. The aircraft specific layout information includes windshield parameters describing the area and/or boundaries of the aircraft's windshield, in an embodiment. In a further embodiment, the aircraft specific layout information may define default parameters indicating positions or boundaries of one or more operational components (e.g., instruments, control components, and/or other features) located within the aircraft cockpit. The term "default parameter," as used herein, means a parameter defined by one or more values to which no offsets have been applied, where the values may define the position (e.g., the pixel position on a display panel) of a point, line, curve, boundary, area or other geometrical feature. When a pilot's head is in a default position and default orientation, a display indicator may be displayed in a location defined by its default parameters. The default parameters defining the configurations of the display indicators may be accessed from a library of display indicator configurations that may be stored in memory device 122.

In an embodiment, processing subsystem 120 is further adapted to receive aircraft data and/or head position data, and to determine modified parameters defining a display indicator based on the default parameters, the aircraft data, and/or the head position data. First modifications to default parameters may be made based on received aircraft data, and second modifications may be made based on received head position data, or vice versa. Accordingly, for a display indicator for which modifications may be made based on both aircraft data and head position data, the modified parameters defining the display indicator may be determined as its default parameters modified by aircraft data related offsets and head position data related offsets.

With respect to modifications to default parameters for an exterior display indicator that are made based on received aircraft data, a modified parameter may include a parameter defined by one or more default values to which one or more offsets have been applied, where the offsets are determined to cause the near-eye display 144 to display the display indicator in a location and at an orientation which reflects a deviation of the attitude of the aircraft from straight and level flight. For example, an exterior display indicator may include a planar grid that represents featureless terrain below the aircraft, and which includes a horizontal virtual horizon. According to its default parameters, the exterior display indicator may be displayed across a lower portion of the windshield. However, when the aircraft is in a steep diving bank to the left, modified parameters may be determined by offsetting values defining the grid so that the horizon extends from a point in the upper left corner of the windshield to a lower right corner of the windshield, and so that the grid consumes the area below the horizon line.

With respect to modifications to default parameters for an interior display indicator or an exterior display indicator that are made based on received head position data, a modified parameter may include a parameter defined by one or more default values to which one or more offsets have been applied, where the offsets are determined to cause the near-eye display 144 to display the display indicator in a location and at an orientation which, when perceived by the pilot, appears to be in the same position or orientation as when the pilot's head was in a default position and orientation. In other words, regardless of changes in the position or orientation of the pilot's head, a display indicator may appear to the pilot to remain statically positioned in proximity to an area of the windshield, an instrument, or a control component at which the display indicator initially was displayed.

In order to cause the near-eye display 144 to display a display indicator, processing subsystem 120 may generate a display signal that includes information representing the parameters (e.g., the modified parameters) for the display indicator. The display signals may be received and communicated to the near-eye display 144 via a near-eye display interface 154 coupled between processing subsystem 120 and near-eye display 144, in an embodiment.

Along with near-eye display interface 154, headgear interfaces 128 also include, in an embodiment, a head position sensing system interface 152, a headphone interface 156, and a microphone (MIC) interface 158. One or more of headgear interfaces 128 may be located on headgear 130 or may be located with on-board processing system 118. Each of headgear interfaces 128 is adapted to communicatively couple processing subsystem 120 with a component of headgear 130.

Headgear 130 includes, in an embodiment, one or more support members 140 that support one or more headgear-mounted, head position sensing components 142, near-eye display 144, one or more headphones 146 or other audio output devices, and a microphone 148 (MIC). Headphones 146 are adapted to output audio signals received over the aircraft radio (not illustrated) and/or from processing subsystem 120 via headphone interface 156. Headphones 146 may include, for example, active noise reduction (ANR) or passive headphones. In an embodiment, in addition to causing near-eye display 144 to display a display indicator, processing subsystem 120 may be adapted to generate signals that cause one or more of headphones 146 to output audio instructions that may further assist the pilot when a potential spatial disorientation situation is detected.

MIC 148 is adapted to detect pilot utterances or other cockpit noises and to convey those utterances or noises to the aircraft radio and/or to processing subsystem 120 via MIC interface 158. MIC 148 may include, for example, a noise cancelling microphone. In an embodiment, headgear 130 also may include a push-to-talk (PTT) switch which, when depressed, causes the aircraft radio to transmit pilot utterances detected by MIC 148 over the air. In other embodiments, a PTT switch may be included in a location other than on headgear 130. In an embodiment, pilot utterances received via MIC 148 and/or a PTT switch may be analyzed by processing subsystem 120 in order to modify the functionality of the on-board pilot assistance system 102. For example, a pilot may be able to indicate, via MIC 140 and/or a PTT switch, that the pilot would like the system to be enabled or disabled.

A head position sensing system includes one or more headgear-mounted, head position sensing components 142 communicatively coupled with one or more cockpit-mounted, head position sensing components (not illustrated). The head position sensing system is adapted to measure the position of the pilot's head within the aircraft cockpit and the orientation of the pilot's head. The position of the pilot's head may be represented, for example, in terms of offsets from a static, default point in the cockpit, which may be represented in Cartesian or polar coordinates. The orientation of the pilot's head may be represented, for example, in terms of angles of rotation about a set of orthogonal reference axes (e.g., axes 160, 161, 162). For example, when the pilot turns his head to the left or right, the movement may be represented in terms of an angle of rotation about axis 160. When the pilot tilts his head up or down (e.g., nods), the movement may be represented in terms of an angle of rotation about axis 161. Finally, when the pilot tilts the top of his head from left to right, the movement may be represented in terms of an angle of rotation about axis 162.

In an embodiment, headgear-mounted, head position sensing components 142 include one or more spatially-separated elements (e.g., coils) mounted on a support member 140 of the headgear 130, and the cockpit-mounted, head position sensing components (not illustrated) include one or more other spatially-separated elements (e.g., coils) distributed within the cockpit. Information describing signals or forces communicated or detected between the headgear-mounted, head position sensing components 142 and the cockpit-mounted, head position sensing components may be communicated to processing subsystem 120 via head position sensing system interface 152. Processing subsystem 120 may analyze the signal information to determine the location and orientation of the pilot's head. In other embodiments, other types of head position sensing systems may be used and/or the signal analysis may be performed by another system element.

Near-eye display 144 may include a monocular or binocular set of transparent displays which are supported by one or more support members 140. During operation, the displays may be supported in substantially vertical positions (assuming the pilot is sitting upright) in a range of 2 to 5 centimeters from the surface of one or both eyes of a pilot that is wearing headgear 130. In an embodiment, the displays may be coupled to a hinging element that enables the displays to be tilted upward and substantially out of the pilot's field of view when not in use. In an embodiment, each transparent display may include a transparent display panel, a light source (e.g., light emitting diodes), one or more prisms adapted to deflect light generated by the light source, one or more polarizers, and one or more lenses. The transparent display panel is adapted to be oriented in proximity to at least one eye of the pilot, and may include, for example, a liquid crystal display (e.g., a liquid crystal on silicon display) or some other type of transparent display.

Near-eye display 144 may be coupled to one or more display engines (not illustrated). In an embodiment, a display engine is located on headgear 130, and receives display signals from processing subsystem 120 via near-eye display interface 154. In another embodiment, the display engine may form a portion of processing subsystem 120 or may be located within on-board processing system 118 or elsewhere.

As discussed above, the processing subsystem 120 may cause one or more display indicators (e.g., display indicators 302, 304, FIG. 3) to be displayed by the near-eye display 144. Processing subsystem 120 may generate and send display signals to the near-eye display 144 via the display engine, where the display signals include information representing the parameters (e.g., the modified parameters) for the display indicators. The display engine is adapted to analyze the display signals and to cause pixels of the transparent display panel to be activated or deactivated in order to produce visible renderings of the desired display indicators on the transparent display panel. As a result, the near-eye display may display one or more display indicators overlying (or otherwise in proximity to) the aircraft windshield, and/or one or more cockpit instruments or control components.

In an embodiment, a computer 104 may be used in conjunction with on-board pilot assistance system 102 in order to facilitate loading software and/or other information onto the on-board pilot assistance system 102. In a particular embodiment, computer 104 is adapted to enable a user to enter information that may later be accessed by on-board pilot assistance system 102. For example, as will be described in more detail later, processing subsystem 120 may take into account other information in determining whether a display indicator should be displayed when a potential spatial disorientation situation exists. This other information may include, for example, information about the pilot such as the pilot's rating (e.g., VFR or IFR), the pilot's experience (e.g., number of VFR and/or IFR flight hours), and/or the pilot's physical characteristics (e.g., height, weight, gender), among other things. Computer 104 may include a laptop computer, a desktop computer, and/or any other computing device having a configuration sufficient to support execution of an information entry application program. In an embodiment, computer 104 includes one or more removable storage media interfaces (e.g., a compact disk (CD) drive and/or universal serial bus (USB) port) that enable computer 104 to copy information (e.g., pilot information) onto a removable storage media (e.g., CD ROM 110 or a USB port-compatible removable storage device 112). In addition or alternatively, computer 104 may include one or more interfaces (e.g., a wireless network adaptor and/or USB port) that enable computer 104 to transmit the information directly to on-board pilot assistance system 102. In an embodiment, when a removable storage media (e.g., CD ROM 110 or an USB port-compatible removable storage device 112) on which such information is stored is inserted into removable storage media interface 126 of on-board pilot assistance system 102, processing subsystem 120 may cause the information to be downloaded into a memory device 122 for later access during a subsequent flight. Alternatively, processing subsystem 120 may not download the information, but instead the removable storage media may be left in the removable storage media interface 126, and processing subsystem 120 may access the information directly from the removable storage media during the subsequent flight.

Figure 2:
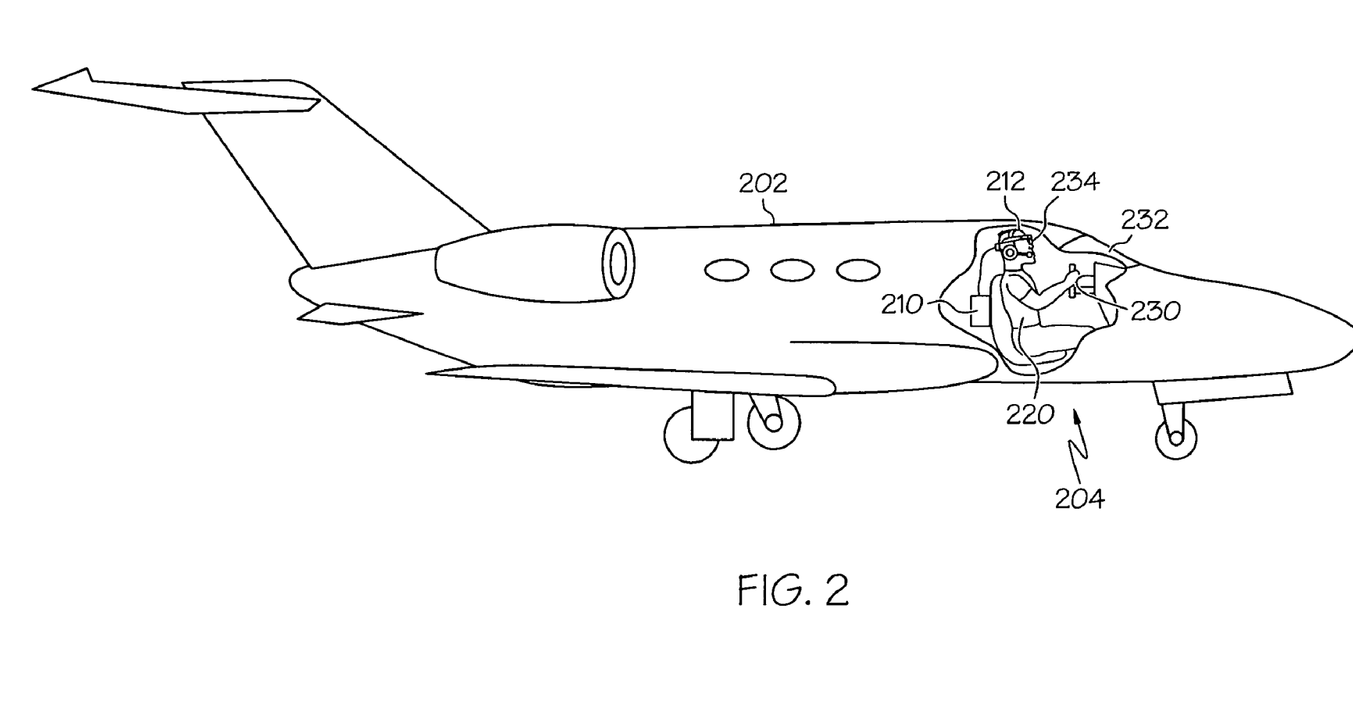
FIG. 2 is a cut-away, side view of an airplane in which a pilot assistance system is incorporated, according to an example embodiment.

FIG. 2 is a cut-away, side view of an airplane 202 in which an on-board pilot assistance system 204 (e.g., on-board pilot assistance system 102, FIG. 1) is incorporated, according to an example embodiment. On-board pilot assistance system 204 includes an on-board processing system 210 (e.g., on-board processing system 118, FIG. 1), headgear interfaces (not illustrated, e.g., headgear interfaces 128, FIG. 1), and headgear 212 (e.g., headgear 130, FIG. 1). On-board processing system 210 may be completely or partially located in or in proximity to the pilot's seat, as illustrated, or may be completely or partially located elsewhere in the airplane 202 (e.g., behind or in proximity to the airplane's instrument panel 230 or elsewhere). In an embodiment, headgear 212 may be operatively coupled to headgear interfaces and/or on-board processing system 210 through cabling and/or through wireless connections.

Headgear 212 may be worn by a pilot 220 while preparing for and conducting a flight. While seated with headgear 212 properly in place, the pilot 220 may generally face the airplane instrument panel 230 and the windshield 232. As indicated above, and as will be explained in more detail below, when the on-board processing system 210 determines that a display indicator should be displayed on the near-eye display 234 (e.g., near-eye display 144, FIG. 1), the on-board processing system 210 issues a display command to a display driver (not illustrated), and the display driver causes the display indicator to be displayed according to the display command. Because the near-eye display 234 includes a transparent display panel, the display indicator may appear to overlie the instrument panel 230 and/or windshield 232. In an embodiment, the display indicators are positioned in a manner that is conformal to the layout of the instrument panel 230, the positions of the aircraft control components, and/or the windshield 232, regardless of the pilot's head position or orientation. In other words, and as described previously, the on-board processing system 210 determines the position and orientation for each display indicator based on its knowledge of the cockpit layout combined with its knowledge of the pilot's head position and orientation.

Figure 3:
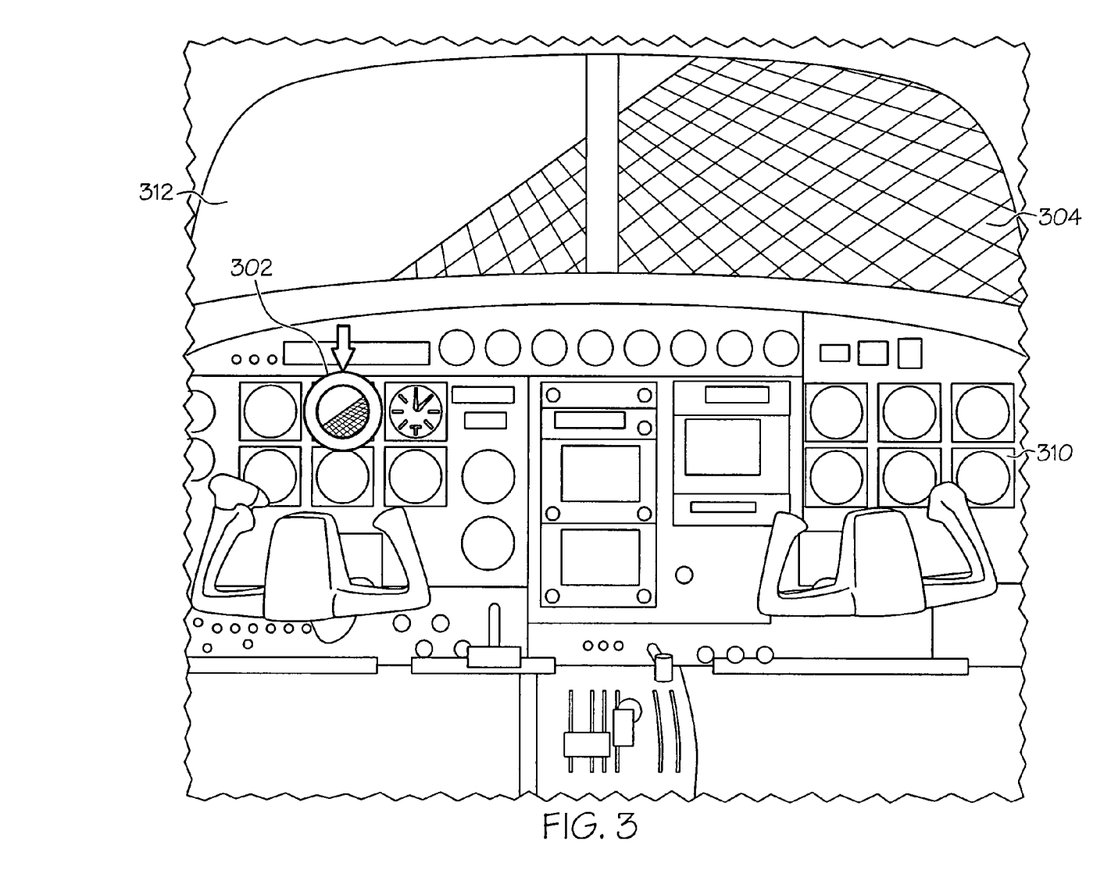
FIG. 3 is an example of an exterior display indicator and an interior display indicator displayed on a transparent display panel, according to an example embodiment.

FIG. 3 is an example of an exterior display indicator 304 and an interior display indicator 302 displayed on a transparent display panel, according to an example embodiment. The view illustrated in FIG. 3 is a pilot's-eye view, where the pilot is located within the cockpit of an airplane. Further describing the perspective of FIG. 3, one may assume that the pilot is wearing headgear (e.g., headgear 130, FIG. 1) and is viewing the airplane instrument panel 310 and windshield 312 through the transparent display of a near-eye display (e.g., near-eye display 144, FIG. 1). When display indicators 302, 304 are displayed on the display panel of the near-eye display and observed by the pilot, the display indicators 302, 304 appear to be overlying the airplane instrument panel 310 and windshield 312.

Exterior display indicator 304 corresponds to an earth-fixed ground reference indicator, and includes a planar grid that may indicate the attitude of the aircraft with respect to a planar representation of the earth's surface. An earth-fixed ground reference indicator such as exterior display indicator 304 may or may not indicate the actual altitude of the aircraft above the ground. Instead, exterior display indicator 304 is designed to indicate the instantaneous attitude of the aircraft, and as the exterior display indicator 304 is updated to compensate for changes in aircraft attitude, heading, and/or position, perceived rotation or other orientation changes of the exterior display indicator 304 will indicate changes in the attitude, heading, and/or position over time. Although exterior display indicator 304 includes a planar grid, in the illustrated embodiment, an exterior display indicator may include a different type of earth-fixed ground reference indicator. For example, but not by way of limitation, an earth-fixed ground reference indicator may include a topographical representation of the terrain over which the aircraft is flying, if such information is available. Alternatively, an earth-fixed ground reference indicator may include a horizon indicator (e.g., a simple line indicating the horizon), a plurality of lines, and/or some other indication that may be perceived to indicate the attitude of the aircraft with respect to the surface of the earth.

Exterior display indicator 304 is configured, in an embodiment, with the intention to provide a visual exterior reference (e.g., an earth-fixed ground reference) without significantly obscuring the exterior view. For example, exterior display indicator 304 includes a planar grid that may indicate the attitude of the aircraft, while still allowing the terrain or exterior obstacles to be viewed, if they would otherwise be visible. Similarly, interior display indicator 302 is configured, in an embodiment, with the intention to direct a pilot's attention to an indicated instrument or control component without significantly obscuring the instruments or the control components. For example, display indicator 302 is an instrument indicator, which includes a donut shaped feature that encircles the instrument (e.g., the attitude indicator) that is intended to be indicated, while still allowing the instrument itself clearly to be viewed.

Desirably, the configuration of each exterior display indicator and interior display indicator conforms to the boundaries of the windshield or the perimeter shape of the instrument or control component being indicated. For example, the edges of exterior display indicator 304 may be cropped so that exterior display indicator 304 is displayed only within the boundaries of the windshield 312. Although display indicator 302 appears to overlie an instrument that it is intended to draw attention to, and display indicator 304 appears to overlie a portion of the windshield 312, display indicators may not appear to overlie the instruments or the windshield, in other embodiments. Instead, a display indicator may be placed in proximity to an instrument or a portion of the windshield in order to draw attention to the instrument or to indicate an exterior feature or reference. As used herein, the term "in proximity to" includes "overlying," "adjacent to," "above," "below," "surrounding," and "partially surrounding."

Although display indicators 302, 304 having certain configurations are illustrated in FIG. 3, these configurations are only examples, and other types of display indicators may be designed for a particular system. Such other types of display indicators may include flashing or fading elements, colored elements, and/or text elements, for example. In addition, other types of display indicators may be implemented, for example, to indicate a direction of an exterior feature (e.g., the direction of an airport, another aircraft or true North, to name a few examples), a target level or setting on an instrument or control component (e.g., a target altitude displayed overlying the altimeter, a target attitude overlying the attitude indicator, a target flap setting, and/or a suggested direction to rotate the yoke, to name a few examples). Accordingly, although two example display elements 302, 304 are illustrated in FIG. 3, the illustrated display elements 302, 304 are not intended to limit the inclusion of a wide variety of other display element configurations, in other embodiments.

Figure 4:
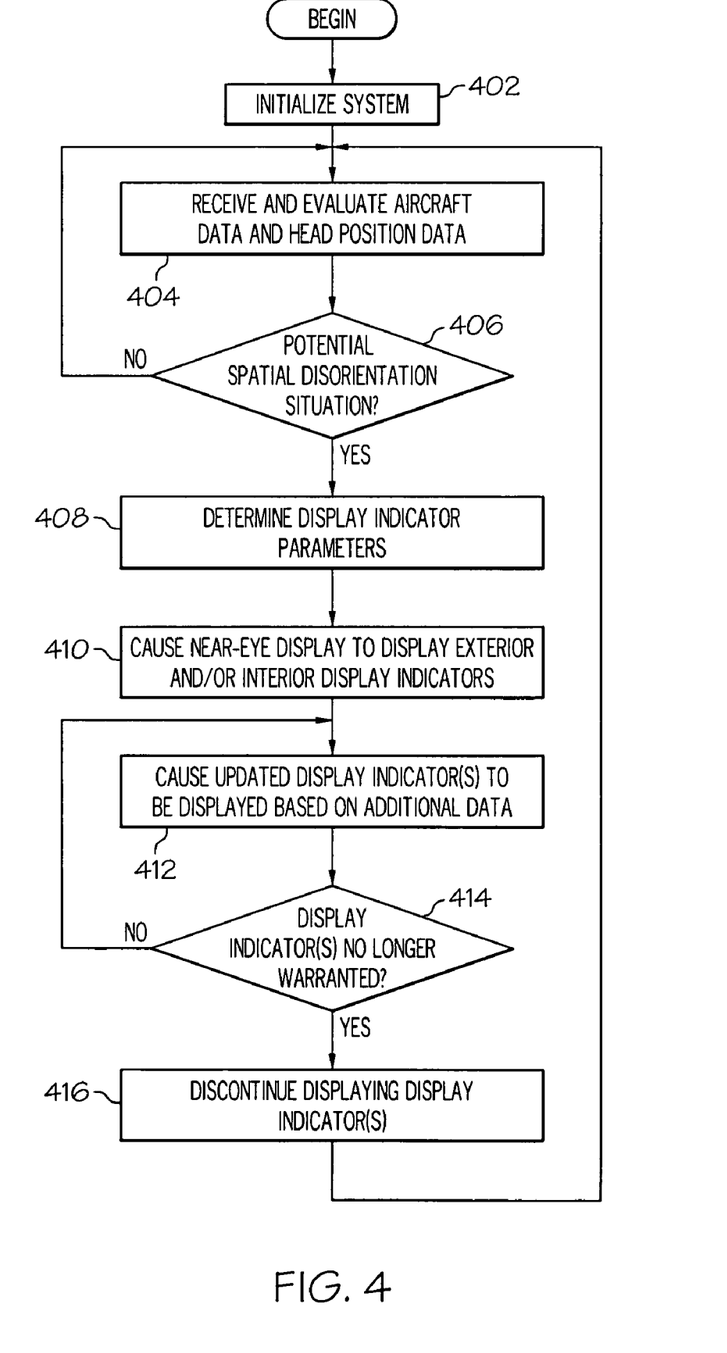
FIG. 4 is a flowchart of a method for determining whether a pilot may be experiencing spatial disorientation and providing pilot assistance, according to an example embodiment.

FIG. 4 is a flowchart of a method for determining whether a pilot may be experiencing spatial disorientation and providing pilot assistance, or more particularly for providing display indicators at times when a pilot may be experiencing spatial disorientation, according to an example embodiment. The method may begin, in block 402, by initializing the on-board pilot assistance system (e.g., on-board pilot assistance system 102, FIG. 1). Initialization of the on-board pilot assistance system may be triggered, for example, by the application of power to the on-board pilot assistance system and/or when some other initialization triggering event occurs (e.g., the pilot provides a user interface input that indicates that the on-board pilot assistance system should be activated). Initialization may include, for example, initiating an instance of a pilot assistance application program on a processing subsystem (e.g., processing subsystem 120, FIG. 1) of the on-board pilot assistance system. During initialization, certain processes may be performed, such as calibrating the head position sensing system, calibrating the near-eye display, and determining the state of the aircraft based on aircraft data received through an aircraft data interface (e.g., aircraft data interface 124, FIG. 1), for example. Calibration processes may or may not include providing display or audio prompts to the pilot to take certain actions (e.g., hold the head straight, look at a target point, indicate accuracy of the location of a displayed indicator, or the like).

In block 404, the system may receive and evaluate aircraft data and head position data. As mentioned previously, the system may receive aircraft data through one or more aircraft data interfaces (e.g., aircraft data interface 124, FIG. 1). Aircraft data may include, for example but not by way of limitation, information (e.g., digital and/or analog signals) that indicates the states (e.g., the operational status and/or setting) of various aircraft components such as the aircraft engine or motor, other aircraft subsystems, flight control surfaces, instruments, and/or control components, among other things. Aircraft data also or alternatively may include, for example but not by way of limitation, digital and/or analog data or signals representing the states of instruments, control components, aircraft subsystems or other sources that indicate altitude, attitude, position, airspeed, engine RPM, fuel level, flight control surface settings, and/or control component settings, among other things. As also mentioned previously, the processing system may receive head position data through an interface with a head position sensing system (e.g., head position sensing system interface 152). As discussed previously, the head position data may indicate the pilot's head orientation and head position within the cockpit. In an embodiment, the system may store the aircraft data and/or head position data in a buffer so that changes and rates of change in aircraft attitude, aircraft altitude, head orientation, and/or head position may later be determined or analyzed.

In block 406, the system may analyze the received aircraft data, head position data, and/or other information to determine whether a potential spatial disorientation situation exists. A "potential" spatial disorientation situation may exist when conditions are such that there is a likelihood that the pilot may be experiencing spatial disorientation. It is to be understood that, even when a determination is made that a potential spatial disorientation situation exists, the pilot may not actually be experiencing spatial disorientation.

In an embodiment, determining whether a potential spatial disorientation situation exists includes determining whether measurable quantities indicating the aircraft's instantaneous attitude and/or change in attitude over time fall within certain ranges and/or have certain relationships with one or more thresholds. In addition or alternatively, this includes determining whether measurable quantities indicating the pilot's instantaneous head orientation or change in orientation over time fall within certain other ranges and/or have certain relationships with other thresholds. In an embodiment, the processing system performs this analysis and determination using one or more biological model algorithms that receive aircraft data and/or head position data as inputs, and that apply the received data to a biological model that will produce, as an output, an indication of whether or not a potential spatial disorientation situation exists. In an embodiment, the biological model algorithm also or alternatively may output an indicator of the likelihood that a potential spatial disorientation situation exists. In other words, the output may include a Boolean indication (e.g., yes or no) that a potential spatial disorientation situation exists or an indication of how likely it is that a potential spatial disorientation situation exists.

In a particular embodiment, the biological model includes a plurality of software decisions that emulate responses produced by vestibular organs when the vestibular organs are exposed to a range of velocities and/or changes in velocity in various directions. The actual velocities and velocity changes experienced by the pilot may be indicated by the aircraft data and/or the head position data. In a further embodiment, the biological model may also emulate responses produced by proprioceptive receptors and/or other biological organs or systems. A description of several relatively common illusions that may cause a pilot to experience spatial disorientation are now described in order to facilitate a later description of how the system may make a determination that a potential spatial disorientation situation exists.

The "graveyard spin" is an illusion that a pilot may experience when the pilot enters a spin in the absence of exterior visual cues. During a graveyard spin, the pilot's vestibular organs may produce sensory signals that cause the pilot to have an erroneous sensation of rotation. For example, a pilot entering a spin to the left initially will have a sensation of spinning to the left. However, although the left spin may continue, the vestibular organs will produce sensory signals that cause the pilot to experience a sensation that the spin is progressively decreasing. Accordingly, if the pilot applies right rudder pressure to stop the left spin, the pilot is likely to sense a spin to the right. In response to the perception that the aircraft is spinning to the right, the pilot may respond by applying left rudder to counteract the perceived right spin. The pilot, thus, may re-enter the original left spin. If too much altitude is lost before the pilot recognizes this illusion, the aircraft may impact the terrain.

The "graveyard spiral" is an illusion that a pilot may experience when the pilot returns to level flight following a prolonged banking turn in the absence of exterior visual cues. Once again, during a graveyard spiral, the pilot's vestibular organs may produce sensory signals that cause the pilot to have an erroneous sensation of rotation. For example, a pilot entering a banking turn to the right initially may have a sensation that the aircraft is turning to the right. If the right turn continues for an extended period of time, the pilot will experience a sensation that the aircraft no longer is turning, but instead is traveling in level flight. If the pilot thereafter levels the wings, the pilot will experience a sensation that the aircraft is banking to the left. If the pilot relies on this sensation, the pilot may re-enter the original right banking turn in an attempt to counteract the sensation that the aircraft is banking to the left. If the pilot fails to recognize this illusion, the aircraft may continue to turn to the right, and eventually the aircraft may impact terrain or some other obstacle.

The "Coriolis illusion" is an illusion that may occur with a sudden tilting forward, backward or sideways of a pilot's head while the aircraft is turning and when exterior visual cues are not present. When the rate of tilting of the pilot's head has certain characteristics, this may produce a strong sensation that the aircraft simultaneously is rolling, pitching, and yawing (e.g., tumbling). The pilot, thus, may become disoriented and may lose control of the aircraft.

For any of the above types of illusions or for other illusions, the system may make a determination that a potential spatial disorientation situation exists by applying received aircraft data and/or head position data to an algorithm that emulates a biological model of the vestibular system, as mentioned above. For example, to determine whether a potential spatial disorientation situation associated with a graveyard spin exists, the system may evaluate aircraft data and make a series of determinations. A first determination may include, for example, determining whether attitude data and/or position data indicates that the aircraft has performed a small radius turn exceeding a predefined angular threshold (e.g., 360 degrees) or exceeding a predefined period of time (e.g., 3 seconds). If so, the aircraft may have entered a spin. A subsequent determination may include, for example, determining whether attitude data, position data, or data from a control component indicates that the pilot has provided a control input (e.g., applying left or right rudder) to counteract the spin. Another subsequent determination may include, for example, determining whether attitude data, position data, or data from a control component indicates that the pilot has provided another control input (e.g., applying right or left rudder) to re-enter the spin. When each of these conditions is met, the algorithm (e.g., the biological model) may produce an output that indicates that the pilot may be in a graveyard spin and that, accordingly a potential spatial disorientation situation exists.

As another example, to determine whether a potential spatial disorientation situation associated with a graveyard spiral exists, the system may evaluate aircraft data and make a series of determinations. A first determination may include, for example, determining whether attitude data and/or position data indicates that the aircraft has performed a prolonged banking turn exceeding a predefined period of time (e.g., 20 seconds). A subsequent determination may include, for example, determining whether attitude data, position data, or data from a control component indicates that the pilot has provided a control input (e.g., applying left or right rudder) to counteract the banking turn (e.g., to return to level flight). Another subsequent determination may include, for example, determining whether attitude data, position data, or data from a control component indicates that the pilot has provided another control input (e.g., applying right or left rudder) to re-enter and sustain the banking turn for another prolonged period of time. When each of these conditions are met, the algorithm (e.g., the biological model) may produce an output that indicates that a potential spatial disorientation situation exists and/or how likely it is that a potential spatial disorientation situation exists.

As yet another example, to determine whether a potential spatial disorientation situation associated with a Coriolis illusion exists, the system may evaluate aircraft data and head position data and make a series of determinations. A first determination may include, for example, determining whether attitude data and/or position data indicates that the aircraft is in a turn. A subsequent determination may include, for example, determining whether head position data indicates that the pilot has changed his head orientation in a manner that is likely to produce spatial disorientation. For example, the head position data may be evaluated to determine whether the pilot has rotated his head about one or more axes (e.g., axes 160-162, FIG. 1) by an angular rotation that exceeds a threshold and/or at a rotational velocity that exceeds another threshold. When each of these conditions are met, the algorithm (e.g., the biological model) may produce an output that indicates that a potential spatial disorientation situation exists and/or how likely it is that a potential spatial disorientation situation exists. The three scenarios given above are for example purposes only. It is to be understood that an algorithm or biological model may be adapted to determine whether a pilot may be experiencing other illusions that may result in a potential spatial disorientation situation, and/or other determinations may be made to determine whether a pilot may be experiencing a graveyard spin, a graveyard spiral or a Coriolis illusion.

In an embodiment, the determination of whether or not a potential spatial disorientation situation exists may take into account additional information other than aircraft data and/or head position data. For example, the determination may take into account pilot information which may be accessible to the system, as described previously. Accordingly, in an embodiment, determining whether a potential spatial disorientation situation exists may include making a determination whether any mitigating or extenuating circumstances are present that may indicate an increase or decrease a likelihood that a spatial disorientation situation exists and/or a likelihood that the pilot may be able effectively to operate the aircraft even when the likelihood that a spatial disorientation situation exists is relatively high. For example, in an embodiment, pilot information such as the pilot's rating (e.g., VFR or IFR) and/or number of logged flying hours for a particular rating may be used to confirm or negate a previous determination (based on aircraft data and/or head position data alone) that a potential spatial disorientation situation exists. When the system determines that a pilot is rated VFR only, for example, a previous determination that a potential spatial disorientation situation exists may be confirmed. Alternatively, when the system determines that a pilot is rated IFR and has logged a significant number of hours under that rating, the previous determination that a potential spatial disorientation situation exists may be negated.

Other information also may be used to confirm or negate a determination that a potential spatial disorientation situation exists. For example, the system may be able to determine (e.g., based on sensors or other information) or estimate (e.g., based on time of day and weather information) whether or not exterior visual cues may be obscured. For example, when the flight is occurring at night or in bad weather, the previous determination that the potential spatial disorientation situation exists may be confirmed. Conversely, when the flight is occurring during the day in clear weather conditions, the previous determination that the potential spatial disorientation situation exists may be negated.

When a determination is made that a potential spatial disorientation situation does not exist, then the method iterates as shown in FIG. 4. Conversely, when a determination is made that a potential spatial disorientation situation does exist, then parameters defining an exterior display indicator are determined, in block 408. This may include, for example, accessing default parameters defining the exterior display indicator, as discussed previously. Based on the default parameters, knowledge of the aircraft attitude (e.g., from aircraft data), and information indicating boundaries of the windshield (e.g., from aircraft specific layout information), modified parameters for the exterior display indicator may be determined, where the modified parameters may result in the generation of an exterior display indicator that is oriented to indicate the attitude of the aircraft and to overlie an appropriate portion of the windshield. In other words, the exterior display indicator may be tilted, offset up or down, and/or rotated to indicate the attitude of the aircraft, and may be cropped to terminate at the boundaries of the windshield. In addition to modifying the display indicator parameters to reflect the aircraft attitude, the modified parameters for the exterior display indicator may be further modified based on knowledge of the pilot's head position and orientation. This may result in the generation of an exterior display indicator that is offset and/or rotated to compensate for the pilot's head position and orientation (e.g., the exterior display indicator is conformal to the windshield regardless of the pilot's head position and orientation). In addition to determining parameters for an exterior display indicator, the system also may determine default and modified parameters defining one or more interior display indicators, as discussed previously.

In block 410, the system may cause the near-eye display to display the exterior and/or interior display indicators by generating display signals that represent the display indicators as defined by the modified parameters. The display signals may be sent, via a near-eye display interface (e.g., near eye display interface 154, FIG. 1), to a display driver associated with the near-eye display, and the display signals may indicate the location and the configuration of the display indicators on the display panel. The display driver may then generate the display indicator on the display panel.

In block 412, the system receives additional aircraft data and head position data, and causes updated display indicators to be displayed based on the additional data. In an embodiment, this includes dynamically re-determining modified parameters for the display indicators as the pilot's head changes position and/or orientation and as the aircraft changes attitude, position, and/or heading. The system generates and sends additional display signals to the display driver, which causes the near-eye display to display the display indicators in the updated locations and/or orientations. In this manner, each display indicator will appear to remain in proximity to (e.g., overlying) the portion of the windshield, the instrument or the control component as the pilot changes his head position and/or orientation and as the aircraft changes its attitude, position, and/or heading. In addition, in the case of external display indicators, the display indicator may appear to rotate, thus indicating that the aircraft is banking, spinning, rolling, and/or pitching.

In block 414, a determination may be made whether one or more of the display indicators are no longer warranted. When at least one display indicator is still warranted, then block 412 will continue to be performed for that display indicator until a determination is made that the display indicator is no longer warranted. The system may determine that a display indicator is no longer warranted, for example by determining that the potential spatial disorientation situation no longer exists based on aircraft data or other information. For example, the system may make this determination when the aircraft has been flying straight and level for some predetermined period of time. Alternatively, the pilot may provide a user input that indicates that the pilot wants the system to discontinue displaying the display indicators (e.g., to deactivate the system). When a display indicator is no longer warranted, then in block 416, the system may discontinue sending signals to the display driver for the given display indicator, and the display indicator will appear to disappear from the display panel. The method may then iterate as shown.

Although the above embodiments discuss generating display indicators in detail, in other embodiments, other types of indicators or prompts also may be provided by the pilot assistance system. For example, the system may automatically generate an audio prompt that is associated with one or more display indicators and/or that provides instructions to the pilot based on the aircraft data. Audio prompts may include, for example but not by way of limitation, speech clips indicating the state of the aircraft (e.g., "You appear to be in a spin to the right"), an indication of one or more instruments to which the pilot may want to direct his or her attention (e.g., "Look at the attitude indicator"), and/or one or more recommended instructions (e.g., "Decrease power and apply left rudder to exit the spin"). In conjunction with the audio prompts, display indicators associated with one or more instruments or control components may be indicated (e.g., the attitude indicator, the throttle, and/or the left rudder pedal). When an audio prompt is warranted, then the system may cause an appropriate audio prompt to be provided to the headphones (e.g., headphones 146, FIG. 1) via a headphone interface (e.g., headphone interface 156, FIG. 1). Digital representations of audio prompts may be stored in and retrieved from a memory device (e.g., memory device 122, FIG. 1). In an alternate embodiment, the system may cause textual representations of such audio prompts to be displayed on the display panel.

Embodiments of pilot assistance methods and systems have now been described. An embodiment includes a system for assisting a pilot of an aircraft. The system includes a near-eye display and a processing subsystem. The near-eye display has a transparent display panel, and the transparent display panel is adapted to be oriented in proximity to at least one eye of the pilot. The processing subsystem is adapted to receive aircraft data that indicates an attitude of the aircraft, and to determine whether the aircraft data indicates a potential spatial disorientation situation. When the aircraft data indicates the potential spatial disorientation situation, the processing system is adapted to cause the near-eye display to display an exterior display indicator overlying at least a portion of the windshield of the aircraft, where the exterior display indicator includes a visual representation of an earth-based reference, and the exterior display indicator is oriented to indicate the attitude of the aircraft.

According to a further embodiment, the processing subsystem is adapted to receive additional aircraft data, and when the additional aircraft data indicates a change in the attitude, a change in a position or a change in a heading of the aircraft, to cause the near-eye display to display an updated exterior display indicator that is altered from the exterior delay indicator based on the additional aircraft data to indicate the change in the attitude, the change in the position or the change in the heading of the aircraft. According to a further embodiment, the system also includes a memory device within which default parameters defining the exterior display indicator are stored, and the processing system is adapted to access the default parameters, and prior to causing the near-eye display to display the exterior display indicator, to determine modified parameters defining the exterior display indicator based on the default parameters, the attitude of the aircraft, and windshield parameters, and to cause the near-eye display to display the exterior display indicator by generating a display signal that represents the exterior display indicator as defined by the modified parameters. According to a further embodiment, the system also includes a head position sensing system adapted to generate head position data representing a head position and a head orientation of the pilot, and the processing subsystem is further adapted to receive the head position data and to cause the near-eye display to display an offset and rotated version the display indicator to compensate for the head position and the head orientation. According to a further embodiment, the system also includes a memory device within which default parameters defining the exterior display indicator are stored, and the processing system is adapted to access the default parameters, to determine modified parameters defining the exterior display indicator based on the default parameters, the attitude of the aircraft, windshield parameters, and the head position data, and to cause the near-eye display to display the exterior display indicator by generating a display signal that represents the exterior display indicator as defined by the modified parameters. According to a further embodiment, the head position sensing system is adapted to generate additional head position data, and the processing system is adapted to receive the additional head position data, and when the additional head position data indicates a change in the head position or a change in the head orientation, to cause the near-eye display to display an updated exterior display indicator that is altered from the exterior delay indicator to indicate the change in the head position or the change in the head orientation. According to a further embodiment, the processing system is adapted to receive layout information defining a physical layout of one or more operational components located within the cockpit, and to determine a location for an interior display indicator on the transparent display panel, where the location is in proximity to an operational component of the one or more operational components, and to cause the near-eye display to display the interior display indicator in the location. According to a further embodiment, the system is incorporated into the aircraft, and the aircraft is an aircraft selected from a group that includes an airplane, a helicopter, a gyroplane, and a glider.

Another embodiment of a system for assisting a pilot of an aircraft includes a near-eye display, a head position sensing system, and a processing subsystem. The near-eye display has a transparent display panel, and the transparent display panel is adapted to be oriented in proximity to at least one eye of the pilot. The head position sensing system is adapted to generate head position data representing a head position and a head orientation of the pilot. The processing subsystem is communicatively coupled to the near-eye display and the head position sensing system, and is adapted to receive aircraft data that indicates an attitude of the aircraft, and to determine whether conditions indicated by the aircraft data or the head position data indicate a potential spatial disorientation situation. When the conditions indicate the potential spatial disorientation situation, the processing subsystem is further adapted to cause the near-eye display to display an exterior display indicator overlying at least a portion of the windshield of the aircraft, where the exterior display indicator includes a visual representation of a static, earth-based reference, which is oriented to indicate the attitude of the aircraft.

According to a further embodiment, the processing subsystem is adapted to receive additional aircraft data, and when the additional aircraft data indicates a change in the attitude, a change in a position or a change in a heading of the aircraft, to cause the near-eye display to display an updated exterior display indicator that is altered from the exterior delay indicator based on the additional aircraft data to indicate the change in the attitude, the change in the position or the change in the heading of the aircraft. According to a further embodiment, the head position sensing system is adapted to generate additional head position data, and the processing system is adapted to receive the additional head position data, and when the additional head position data indicates a change in the head position or a change in the head orientation, to cause the near-eye display to display an updated exterior display indicator that is altered from the exterior delay indicator to indicate the change in the head position or the change in the head orientation.

Another embodiment includes a method for assisting a pilot of an aircraft, the method includes the steps of receiving aircraft data that indicates an attitude of the aircraft, determining whether the aircraft data indicates a potential spatial disorientation situation, and when the aircraft data indicates the potential spatial disorientation situation, causing a near-eye display to display an exterior display indicator on a transparent display panel to overly at least a portion of the windshield of the aircraft, where the exterior display indicator includes a visual representation of an earth-based reference, which is oriented to indicate the attitude of the aircraft.

According to a further embodiment, the step of determining includes applying the aircraft data to a biological model of a vestibular system adapted to produce an output based on the aircraft data. According to a further embodiment, the step of determining includes determining whether the head position data indicates a graveyard spin. According to a further embodiment, the step of determining includes determining whether the head position data indicates a graveyard spiral. According to a further embodiment, the method also includes the step of receiving head position data that indicates a head position and a head orientation of the pilot, and the step of determining includes determining whether the head position data indicates a Coriolis illusion. According to a further embodiment, the method also includes the steps of receiving additional aircraft data, determining whether the additional aircraft data indicates a change in the attitude, a change in a position or a change in a heading of the aircraft, and when the additional aircraft data indicates the change in the attitude or the change in the position of the aircraft, causing the near-eye display to display an updated exterior display indicator that is altered from the exterior delay indicator based on the additional aircraft data to indicate the change in the attitude, the change in the position or the change in the heading of the aircraft. According to a further embodiment, the step of causing includes accessing default parameters defining the exterior display indicator, determining modified parameters defining the exterior display indicator based on the default parameters, the attitude of the aircraft, and windshield parameters, and causing the near-eye display to display the exterior display indicator by generating a display signal that represents the exterior display indicator as defined by the modified parameters. According to a further embodiment, the method also includes the step of receiving head position data that indicates a head position and a head orientation of the pilot, and the step of determining the modified parameters includes determining the modified parameters to define the exterior display indicator based on the default parameters, the attitude of the aircraft, the windshield parameters, and the head position data. According to a further embodiment, the method also includes the steps of receiving additional head position data, determining whether the additional head position data indicates a change in the head position or a change in the head orientation, and when the additional head position data indicates the change in the head position or the change in the head orientation, causing the near-eye display to display an updated exterior display indicator that is altered from the exterior delay indicator based on the additional head position data to indicate the change in the head position or the change in the head orientation.

Embodiments of the above-described systems and methods may provide one or more advantages over traditional systems and methods. For example, using embodiments of the inventive subject matter, a pilot may be provided with a simulated, exterior visual cue (e.g., an exterior display indicator), which may assist the pilot in avoiding or rapidly recovering from a spatial disorientation situation. The various embodiments described above have been described herein in terms of functional block components and various processing steps. It should be appreciated that such functional blocks may be realized by any number of hardware, firmware, and/or software components configured to perform the specified functions.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the embodiments in any way. Rather, the foregoing detailed description will provide those skilled in the art with a convenient road map for implementing an exemplary embodiment. It being understood that various changes may be made in the function and arrangement of elements described in an exemplary embodiment without departing from the scope of the inventive subject matter as set forth in the appended claims.

What is claimed is:

1. A system for assisting a pilot of an aircraft that includes a cockpit and a windshield, the system comprising:
   a near-eye display having a transparent display panel, wherein the transparent display panel is adapted to be oriented in proximity to at least one eye of the pilot; and
   a processing subsystem communicatively coupled to the near-eye display, wherein the processing subsystem is adapted to receive aircraft data that indicates an attitude of the aircraft, to determine whether the pilot has provided one or more control inputs to a rudder of the aircraft, to determine whether a combination of the aircraft data and the one or more control inputs provided by the pilot indicate a likelihood that the pilot is experiencing a potential spatial disorientation situation, and when the aircraft data and the one or more control inputs indicate the likelihood of the potential spatial disorientation situation, to cause the near-eye display to display an exterior display indicator overlying at least a portion of the windshield, wherein the exterior display indicator includes a visual representation of an earth-based reference, and the exterior display indicator is oriented to indicate the attitude of the aircraft.

2. The system of claim 1, wherein the processing subsystem is further adapted to receive additional aircraft data, and when the additional aircraft data indicates a change in the attitude, a change in a position or a change in a heading of the aircraft, to cause the near-eye display to display an updated exterior display indicator that is altered from the exterior display indicator based on the additional aircraft data to indicate the change in the attitude, the change in the position or the change in the heading of the aircraft.

3. The system of claim 1, further comprising:
   a memory device within which default parameters defining the exterior display indicator are stored, and
   wherein the processing system is adapted to access the default parameters, and prior to causing the near-eye display to display the exterior display indicator, to determine modified parameters defining the exterior display indicator based on the default parameters, the attitude of the aircraft, and windshield parameters, and to cause the near-eye display to display the exterior display indicator by generating a display signal that represents the exterior display indicator as defined by the modified parameters.

4. The system of claim 1, further comprising:
   a head position sensing system communicatively coupled to the processing subsystem and adapted to generate head position data representing a head position and a head orientation of the pilot,
   wherein the processing subsystem is further adapted to receive the head position data and to cause the near-eye display to display an offset and rotated version the display indicator to compensate for the head position and the head orientation.

5. The system of claim 4, further comprising:
   a memory device within which default parameters defining the exterior display indicator are stored, and
   wherein the processing system is adapted to access the default parameters, to determine modified parameters defining the exterior display indicator based on the default parameters, the attitude of the aircraft, windshield parameters, and the head position data, and to cause the near-eye display to display the exterior display indicator by generating a display signal that represents the exterior display indicator as defined by the modified parameters.

6. The system of claim 4, wherein the head position sensing system is further adapted to generate additional head position data, and the processing system is further adapted to receive the additional head position data, and when the additional head position data indicates a change in the head position or a change in the head orientation, to cause the near-eye display to display an updated exterior display indicator that is altered from the exterior display indicator to indicate the change in the head position or the change in the head orientation.

7. The system of claim 1, wherein the processing system is further adapted to receive layout information defining a physical layout of one or more operational components located within the cockpit, and to determine a location for an interior display indicator on the transparent display panel, wherein the location is in proximity to an operational component of the one or more operational components, and to cause the near-eye display to display the interior display indicator in the location.

8. The system of claim 1, wherein the system is incorporated into the aircraft, and the aircraft is an aircraft selected from a group that includes an airplane, a helicopter, a gyroplane, and a glider.

9. A system for assisting a pilot of an aircraft that includes a cockpit and a windshield, the system comprising:
   a near-eye display having a transparent display panel, wherein the transparent display panel is adapted to be oriented in proximity to at least one eye of the pilot;
   a head position sensing system adapted to generate head position data representing a head position and a head orientation of the pilot; and
   a processing subsystem communicatively coupled to the near-eye display and the head position sensing system, wherein the processing subsystem is adapted to receive aircraft data that indicates an attitude of the aircraft, to determine whether the pilot has provided one or more control inputs to a rudder of the aircraft, to determine whether a combination of the one or more control inputs and conditions indicated by the aircraft data and the head position data indicate a likelihood that the pilot is experiencing a potential spatial disorientation situation, and when the one or more control inputs and conditions indicate the likelihood of the potential spatial disorientation situation, to cause the near-eye display to display an exterior display indicator overlying at least a portion of the windshield, wherein the exterior display indicator includes a visual representation of a static, earth-based reference, which is oriented to indicate the attitude of the aircraft.

10. The system of claim 9, wherein the processing subsystem is further adapted to receive additional aircraft data, and when the additional aircraft data indicates a change in the attitude, a change in a position or a change in a heading of the aircraft, to cause the near-eye display to display an updated exterior display indicator that is altered from the exterior display indicator based on the additional aircraft data to indicate the change in the attitude, the change in the position or the change in the heading of the aircraft.

11. The system of claim 9, wherein the head position sensing system is further adapted to generate additional head position data, and the processing system is further adapted to receive the additional head position data, and when the additional head position data indicates a change in the head position or a change in the head orientation, to cause the near-eye display to display an updated exterior display indicator that is altered from the exterior display indicator to indicate the change in the head position or the change in the head orientation.

12. A method for assisting a pilot of an aircraft that includes an on-board processing system, a cockpit and a windshield, the method performed by the on-board processing system and comprising the steps of:
   receiving aircraft data that indicates an attitude of the aircraft;
   determining whether the pilot has provided one or more control inputs to a rudder of the aircraft;
   determining whether a combination of the aircraft data and the one or more control inputs provided by the pilot indicate a likelihood that the pilot is experiencing a potential spatial disorientation situation; and
   when the aircraft data and the one or more control inputs indicate the likelihood of the potential spatial disorientation situation, causing a near-eye display to display an exterior display indicator on a transparent display panel to overly at least a portion of the windshield, wherein the exterior display indicator includes a visual representation of an earth-based reference, which is oriented to indicate the attitude of the aircraft.

13. A method for assisting a pilot of an aircraft that includes an on-board processing system, a cockpit and a windshield, the method performed by the on-board processing system and comprising the steps of:
   receiving aircraft data that indicates an attitude of the aircraft;
   determining whether the pilot has provided one or more control inputs to a control component of the aircraft;
   determining whether a combination of the aircraft data and the one or more control inputs provided by the pilot indicate a likelihood that the pilot is experiencing a potential spatial disorientation situation by applying the aircraft data to a biological model of a vestibular system adapted to produce an output based on the aircraft data, wherein the biological model includes software that emulates responses produced by vestibular organs when the vestibular organs are exposed to a range of velocities; and
   when the aircraft data and the one or more control inputs indicate the likelihood of the potential spatial disorientation situation, causing a near-eye display to display an exterior display indicator on a transparent display panel to overly at least a portion of the windshield, wherein the exterior display indicator includes a visual representation of an earth-based reference, which is oriented to indicate the attitude of the aircraft.

14. A method for assisting a pilot of an aircraft that includes an on-board processing system, a cockpit and a windshield, the method performed by the on-board processing system and comprising the steps of:
   receiving aircraft data that indicates an attitude of the aircraft;
   determining whether the aircraft data and one or more pilot actions indicate a likelihood that the pilot is experiencing a potential spatial disorientation situation, wherein determining comprises determining whether the aircraft data and the one or more pilot actions indicate a likelihood of a graveyard spin type of potential spatial disorientation situation by
      determining that the aircraft has made a small radius turn that may correspond to the aircraft entering a spin,
      subsequently determining that the pilot has provided a first control input to counteract the spin, and subsequently determining that the pilot has provided a second control input to re-enter the spin; and when the aircraft data and the one or more pilot actions indicate the likelihood of the potential spatial disorientation situation, causing a near-eye display to display an exterior display indicator on a transparent display panel to overly at least a portion of the windshield, wherein the exterior display indicator includes a visual representation of an earth-based reference, which is oriented to indicate the attitude of the aircraft.

15. A method for assisting a pilot of an aircraft that includes an on-board processing system, a cockpit and a windshield, the method performed by the on-board processing system and comprising the steps of:

receiving aircraft data that indicates an attitude of the aircraft;

determining whether the aircraft data and one or more pilot actions indicate a likelihood that the pilot is experiencing a potential spatial disorientation situation, wherein determining comprises determining whether the aircraft data and the one or more pilot actions indicate a likelihood of a graveyard spiral type of potential spatial disorientation situation by determining that the aircraft has made a banking turn for a first prolonged period of time, subsequently determining that the pilot has provided a first control input to counteract the banking turn, and subsequently determining that the pilot has provided a second control input to re-enter and sustain the banking turn for a second prolonged period of time; and when the aircraft data and the one or more pilot actions indicate the likelihood of the potential spatial disorientation situation, causing a near-eye display to display an exterior display indicator on a transparent display panel to overly at least a portion of the windshield, wherein the exterior display indicator includes a visual representation of an earth-based reference, which is oriented to indicate the attitude of the aircraft.

16. The method of claim 12, further comprising the step of:
receiving head position data that indicates a head position and a head orientation of the pilot, and wherein determining comprises determining whether the head position data indicates a Coriolis illusion.

17. The method of claim 12, further comprising the steps of:

receiving additional aircraft data;

determining whether the additional aircraft data indicates a change in the attitude, a change in a position or a change in a heading of the aircraft; and when the additional aircraft data indicates the change in the attitude or the change in the position of the aircraft, causing the near-eye display to display an updated exterior display indicator that is altered from the exterior display indicator based on the additional aircraft data to indicate the change in the attitude, the change in the position or the change in the heading of the aircraft.

18. The method of claim 12, wherein causing comprises the steps of:

accessing default parameters defining the exterior display indicator;

determining modified parameters defining the exterior display indicator based on the default parameters, the attitude of the aircraft, and windshield parameters; and causing the near-eye display to display the exterior display indicator by generating a display signal that represents the exterior display indicator as defined by the modified parameters.

19. The method of claim 18, further comprising:
receiving head position data that indicates a head position and a head orientation of the pilot, and
wherein determining the modified parameters comprises determining the modified parameters to define the exterior display indicator based on the default parameters, the attitude of the aircraft, the windshield parameters, and the head position data.

20. The method of claim 19, further comprising:
receiving additional head position data;
determining whether the additional head position data indicates a change in the head position or a change in the head orientation; and
when the additional head position data indicates the change in the head position or the change in the head orientation, causing the near-eye display to display an updated exterior display indicator that is altered from the exterior delay indicator based on the additional head position data to indicate the change in the head position or the change in the head orientation.

21. A system for assisting a pilot of an aircraft that includes a cockpit, an instrument panel, and a windshield, the system comprising:

a near-eye display having a transparent display panel, wherein the transparent display panel is adapted to be oriented in proximity to at least one eye of the pilot; and a processing subsystem communicatively coupled to the near-eye display, wherein the processing subsystem is adapted to receive aircraft data that indicates an attitude of the aircraft and layout information defining a physical layout of one or more operational components located within the cockpit, to determine whether the aircraft data and one or more pilot actions indicate a likelihood that the pilot is experiencing a potential spatial disorientation situation, and when the aircraft data and the one or more pilot actions indicate the likelihood of the potential spatial disorientation situation, to determine a location for an interior display indicator on the transparent display panel, wherein the location is in proximity to an operational component of the one or more operational components, and to cause the near-eye display to display the interior display indicator in the location in a manner intended to direct attention of the pilot to the operational component.

22. The system of claim 21, wherein the operational component is selected from a group consisting of a control component and a cockpit instrument.

23. The system of claim 21, wherein the internal display indicator is displayed overlying the instrument panel.

24. The system of claim 21, wherein the internal display indicator is displayed in proximity to an operational component selected from a group consisting of an attitude indicator, a throttle, and a rudder pedal.

* * * * *